United States Patent [19]

Fazio

[11] Patent Number: 4,519,159
[45] Date of Patent: May 28, 1985

[54] STABILIZER STRAP

[76] Inventor: Sebastian Fazio, 188 Raymond Rd., Rocky Hill, Conn. 06067

[21] Appl. No.: 569,406

[22] Filed: Jan. 9, 1984

[51] Int. Cl.³ .............................................. A01K 97/00
[52] U.S. Cl. ........................................................ 43/25
[58] Field of Search .................... 43/25, 21.2, 18.1, 23

[56] References Cited

U.S. PATENT DOCUMENTS

| | | | |
|---|---|---|---|
| 2,146,350 | 2/1939 | Roberts | 43/25 |
| 2,158,104 | 5/1939 | Bowen | 43/25 |
| 2,443,946 | 6/1948 | Bozorth, Jr. | 43/25 |
| 2,653,406 | 9/1953 | Grabiak | 43/25 |
| 2,685,755 | 8/1954 | Gorenflo | 43/23 |
| 2,761,236 | 9/1956 | Gaston | 43/25 |
| 2,869,276 | 1/1959 | Hagen | 43/25 |
| 3,797,157 | 3/1974 | Semich | 43/25 |
| 4,041,635 | 8/1977 | Savage | 43/25 |

Primary Examiner—Gene P. Crosby
Attorney, Agent, or Firm—Henderson & Sturm

[57] ABSTRACT

A stabilizer structure for preventing undesirable rotation of a fishing pole while a fish is being cranked in, such stabilizer structure being comprised of a leather strap which is attached to the handle section of a fishing pole forwardly of where the reel is attached, on one side of such fishing pole handle section, depending upon whether the person using the rod and reel assembly is right or left handed. Such strap permits the person using the fishing rod and reel assembly to put one hand through such strap whereby the hand is disposed between the strap and the handle section and whereby the other hand is used to crank in the line and the fish while the first mentioned hand prevents rotation of the fishing pole.

4 Claims, 5 Drawing Figures

STABILIZER STRAP

TECHNICAL FIELD

The present invention relates generally to fishing equipment and more particularly an accessory for preventing fishing rod and reel assemblies from rotating at a time when a fish is being cranked in using such fishing devices.

BACKGROUND ART

The right-handed person, while holding a rod in a normal manner, would have the left hand on the forward cork grip of the handle section of a salt water-type pole and the butt of such rod against the person's belly or socketed in a special belt. At the same time the right hand would be used for cranking the reel handle in a clockwise direction. When this is done after a large fish is hooked on such combination rod and reel assembly, the rod and reel assembly has a tendency to rotate to the right. This rotation causes the reel to become positioned at a very awkward angle, making it difficult, if not impossible, to continue cranking. This situation becomes even more acute with each fish that is caught. The forward grip becomes slippery from being wet and from having fish slime transferred to it from one's hands. Consequently, it becomes increasingly necessary to grip the rod ever more tightly to attempt to keep it from rotating; and, this occurs at a time when such person has become fatigued from the labors of catching several fish. It may also occur at a time when such person's fingers may become numb from the cold, all of which makes it practically impossible to continue fishing, or at the very least, causing such activity to no longer be pleasurable as a sport should be.

Various attempts have been made to solve the aforementioned problem. For example, U.S. Pat. No. 2,761,236 to Gaston provides an auxiliary hand grip for a fishing rod for obtaining better leverage on such fishing rod. U.S. Pat. No. 2,158,104 to Bowen shows an arm rest for attachment to a handle section of a fishing pole for cradling a person's arm therein and thereby to some extent preventing rotation of the fishing pole as a fish is being cranked in. Likewise, U.S. Pat. No. 2,869,276 shows a brace connected to a fishing reel and allowing such reel to be clamped to a person's arm while such arm is grasping the fishing pole handle section for facilitating easier use of a rod and reel structure. U.S. Pat. No. 2,443,946 utilizes a chain structure for a fishing pole holder which appears to be similar to the present invention, but is provided for the purpose of preventing loss of a fishing pole while fishing.

While there have been various attempts to solve the problem of rotation of fishing pole and reel assembly while reeling in a fish, none of the prior art structures have adequately solved the problem, and there is therefore a need for a more simple and universally acceptable solution to the problem.

DISCLOSURE OF THE INVENTION

The present invention relates to a stablizer structure for preventing undesirable rotation of a fishing pole while a fish is being cranked in, such stablizer structure being comprised of a leather strap which is attached to the handle section of a fishing pole forwardly of where the reel is attached to such fishing pole handle section. The strap is attached on one side of such fishing pole handle section, depending upon whether the person using the rod and reel assembly is right or left handed. Such strap permits the person using the fishing rod and reel assembly to put one hand through such strap whereby the hand is disposed between the strap and the handle section and whereby the other hand is used to crank in the line and the fish while the first mentioned hand prevents rotation of the fishing pole.

An object of the present invention is to provide an improved apparatus for preventing a fishing pole from rotating while in use.

Another object of the present invention is to provide an improved device for preventing rotation of a fishing pole which is simple to construct and is universally adaptable for persons of any size.

Still another object of the present invention is to provide a device of the type mentioned above which is economical to produce and simple to use.

Other objects, advantages, and novel features of the present invention will become apparent from the following detailed description of the invention when considered in conjunction with the accompanying drawings.

BEST MODES FOR CARRYING OUT THE INVENTION

Figure 1:
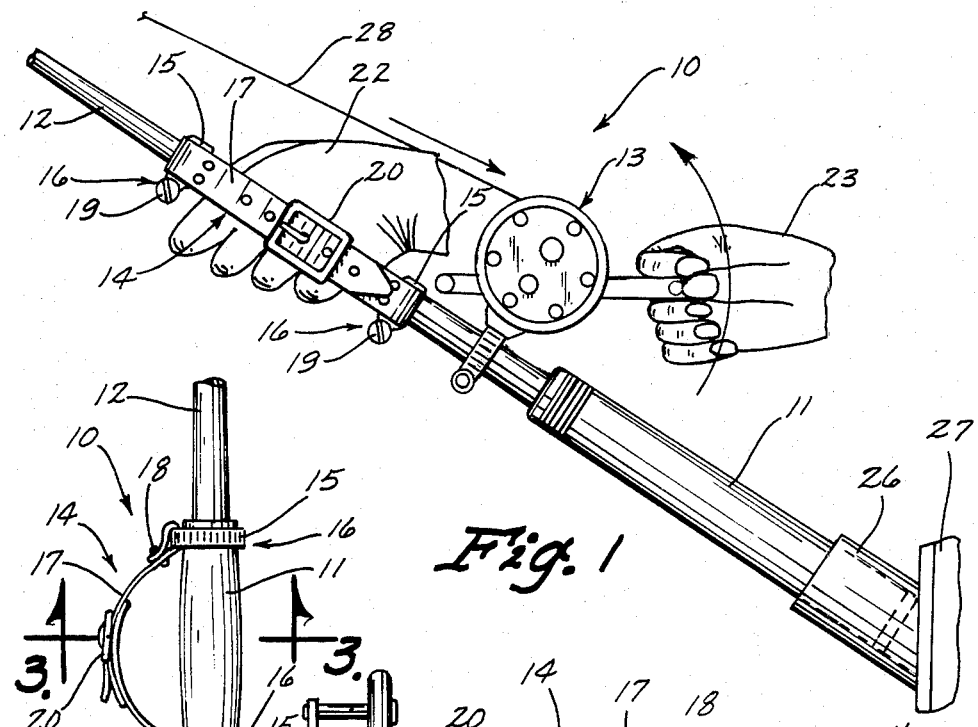
FIG. 1 shows a side elevational view of a portion of a fishing pole having the present invention attached thereto while in use.

Referring now to the drawings, wherein like reference numerals designate identical or corresponding parts throughout the several views, FIG. 1 shows a rod and reel assembly (10) including a fishing rod with a handle section (11), a flexible section (12) and a reel (13) which is attached to the handle section (11) by conventional structures.

Figure 2:
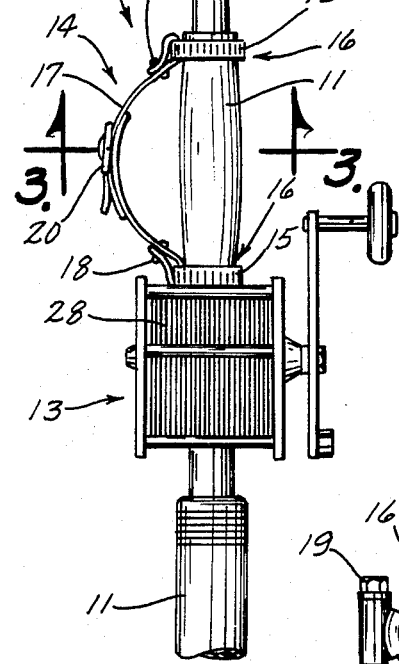
FIG. 2 is a top view of the relevant portion of the fishing rod shown in FIG. 1 having the present invention attached thereto.
Figure 3:
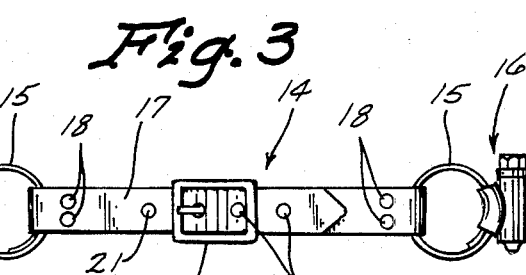
FIG. 3 is a cross-sectional view taken along line 3—3 of FIG. 2.
Figure 4:
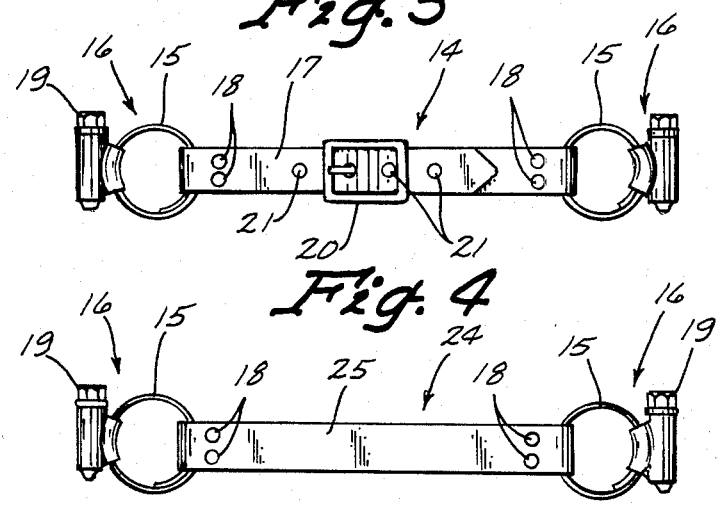
FIG. 4 is a side view of the present invention shown separate from the fishing pole rod and reel assembly.

A stablizer strap (14) is attached to the handle section (11) of the fishing pole, for example as shown in FIGS. 1-3. Commercially available hose clamp structures (16) are attached to each end of the leather portion (17) of stablizer strap (14) by means of rivets (18) which hold the looped ends of the leather portion (17) of the stablizer (14) in place. A buckle (20) is attached to the leather portion (17) of the stablizer strap (14) in a conventional manner; and, in cooperation with the holes (21) in the leather strap (17), permit the stablizer strap (14) to be adjustable to fit the hand size of the user.

The hose clamps (16) are attached to the fishing pole handle by slipping each such clamp (16) over the flexible portion (12) of the fishing pole and down to a position in front of the reel (13), for example to the position shown in FIGS. 1 and 2. Once the clamps (16) are positioned as shown in the drawings, then the members (19) are rotated in an appropriate direction to cause the metal bands (15) to tighten down in tight frictional contact with the handle section (11) to firmly hold the stablizer strap (14) in place. For a reel to be cranked with the left hand, the stablizer strap (14) would, of course, be mounted on the right side of the handle section (11).

In operation of the embodiment shown in FIGS. 1-4, it is noted that it is set up for a right-handed user wherein the left hand (22), as shown in FIG. 1, is inserted from the top through the loop made by the stablizer strap (14) and the cork grip (11) is grasped in the usual manner. Now, when a fish is caught and the reel is cranked, thereby creating a tendency for the rod to rotate in a clockwise direction, a slight opposing pressure exerted by the left wrist in a counterclockwise direction will quickly stablize the reel and retain it in the correct position for proper cranking. Even if the hands are slippery, there is no problem of maintaining the rod in its proper position and little or no gripping force is needed, so that fatigue is reduced significantly.

Figure 5:
FIG. 5 shows an alternate embodiment of the present invention having a fixed length.

Referring now to FIG. 5, an alternate embodiment (24) is shown. The only difference between the embodiment shown in FIGS. 1-4 and the embodiment shown in FIG. 5 is that the leather portion (25) of the stablizer strap (24) is made in one piece and is not adjustable, thereby reducing its cost and making it more economically accessible, especially if the adjustable feature of the stablizer strap (14) is not needed or desired.

Obviously many modifications of variations of the present invention are possible in light of the above teachings. It is therefore to be understood that, within the scope of the appended claims, the invention may be practiced otherwise than as specifically described.

I claim:

1. An accessory for use with fishing poles of a type including a stiff handle section at one end thereof and a flexible section at the other end thereof, said flexible section having fishing line guide means thereon and said handle section having means intermediate the ends thereof for attachment of a fishing reel thereto, said accessory comprising:
   stablizer means for preventing undesirable rotation of said fishing pole while a fish is being reeled in, said stablizer means comprising a flexible strap; and
   means for connecting each end of said strap to said handle section forwardly of said fishing reel for generally positioning said strap to one side of said handle section whereby one hand can be received between said strap and said handle section thereby preventing undesirable rotation of said fishing pole.

2. The accessory of claim 1 wherein said means for connecting said strap to said handle section further comprises means for selectively permitting said strap to be positioned on the other side of said handle section whereby the other hand of a person can be used to hold said rod handle section if desired.

3. The accessory of claim 1 wherein said strap includes means for adjusting the space between said handle section and said strap for adjustment to conform to the size of different people's hands.

4. The accessory of claim 3 wherein said connecting means comprises a first clamp attached to one end of said strap, said first clamp extending around a first portion of said handle section and a second clamp attached to the other end of said strap, said second clamp extending around a second portion of said handle section.

* * * * *